(12) United States Patent
Christfort

(10) Patent No.: US 8,326,440 B2
(45) Date of Patent: Dec. 4, 2012

(54) SYSTEM FOR INTELLIGENT DELEGATION OF IRRIGATION CONTROL

(75) Inventor: Jacob Christen Christfort, Novato, CA (US)

(73) Assignee: Ranch Systems LLC, Novato, CA (US)

( * ) Notice: Subject to any disclaimer, the term of this patent is extended or adjusted under 35 U.S.C. 154(b) by 914 days.

(21) Appl. No.: 12/391,171

(22) Filed: Feb. 23, 2009

(65) Prior Publication Data

US 2009/0216345 A1 Aug. 27, 2009

Related U.S. Application Data

(60) Provisional application No. 61/030,962, filed on Feb. 23, 2008.

(51) Int. Cl.
*G05B 9/03* (2006.01)
(52) U.S. Cl. ............... 700/21; 700/79; 700/284; 455/39
(58) Field of Classification Search .................... 700/79, 700/284, 21; 455/39
See application file for complete search history.

(56) References Cited

U.S. PATENT DOCUMENTS

| | | |
|---|---|---|
| 6,782,310 B2 | 8/2004 | Bailey et al. |
| 6,823,239 B2 | 11/2004 | Sieminski |
| 7,010,394 B1 * | 3/2006 | Runge et al. .................. 700/284 |
| 7,182,272 B1 * | 2/2007 | Marian ........................... 239/69 |

OTHER PUBLICATIONS

Oshaughnessy, S. et. al. , "IRT wireless interface for automatic irrigation scheduling of a center pivot system" , Proceedings of the 28th Annual International Irrigation Show, Dec. 9-11, 2007, San Diego, CA, p. 176-186. 2007 CDROM. http://www.ars.usda.gov/research/publications/Publications.htm?seq_no_115=217919.
Delwiche, M., et al., "Precision Irrigation in Landscape by Wireless Network", Progress Report for Slosson Endowment, Jul. 2006-Jun. 2007. http://groups.ucanr.org/slosson/documents/2006-200712577.pdf.

* cited by examiner

*Primary Examiner* — Tejal Gami
(74) *Attorney, Agent, or Firm* — Hickman Palermo Truong Becker Bingham Wong LLP

(57) ABSTRACT

A node of a fault-tolerant system relies upon a primary communication mechanism, when possible, for primary connection to a central server. The node monitors its primary connection to the server. While the primary connection is active, the node operates in a supervised mode, in that it generally does not perform a certain subset of tasks without having received real-time commands from the server to perform those tasks. However, when the node detects that it is no longer connected to the server, the node transitions into a fail-over mode. The node operates in the fail-over mode until the node detects that primary connection is re-established. While in fail-over mode, the node may execute a stored set of fail-over instructions that were provided by the server. The node may also attempt to establish a backup connection to the server via a second and different type of communication mechanism.

30 Claims, 10 Drawing Sheets

SYSTEM FOR INTELLIGENT DELEGATION OF IRRIGATION CONTROL

PRIORITY CLAIM

This application claims the benefit under 35 U.S.C. 119(e) of provisional Application No. 61/030,962, filed Feb. 23, 2008, the entire contents of which are hereby incorporated by reference for all purposes as if fully set forth herein.

FIELD OF THE INVENTION

Embodiments of the invention described herein relate generally to fault-tolerant systems, and, more specifically, to techniques for remotely managing devices via communication links that may not always be active.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

One challenge in deploying distributed systems is that communication links between the different components of a distributed system may not always be reliable. For example, communication links are susceptible to failures resulting from a wide variety of problems, including damaged cables, faulty communication interfaces, signal interference or degradation, failed relay systems, power shortages, and limited bandwidth.

Unreliable communication links cause many problems in systems that rely on one or a limited number of servers to coordinate the activity of other devices. For example, an irrigation control system may rely on a server to issue irrigation commands to wireless irrigation controllers deployed throughout a farm. A connection failure between the server and a controller could result in the controller failing to receive a command to, for instance, open or close an irrigation valve, with the potential consequence of a failed crop.

It is therefore desirable to provide more robust and fault-tolerant techniques for coordinating the activities of devices in systems with potentially unreliable communication links.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
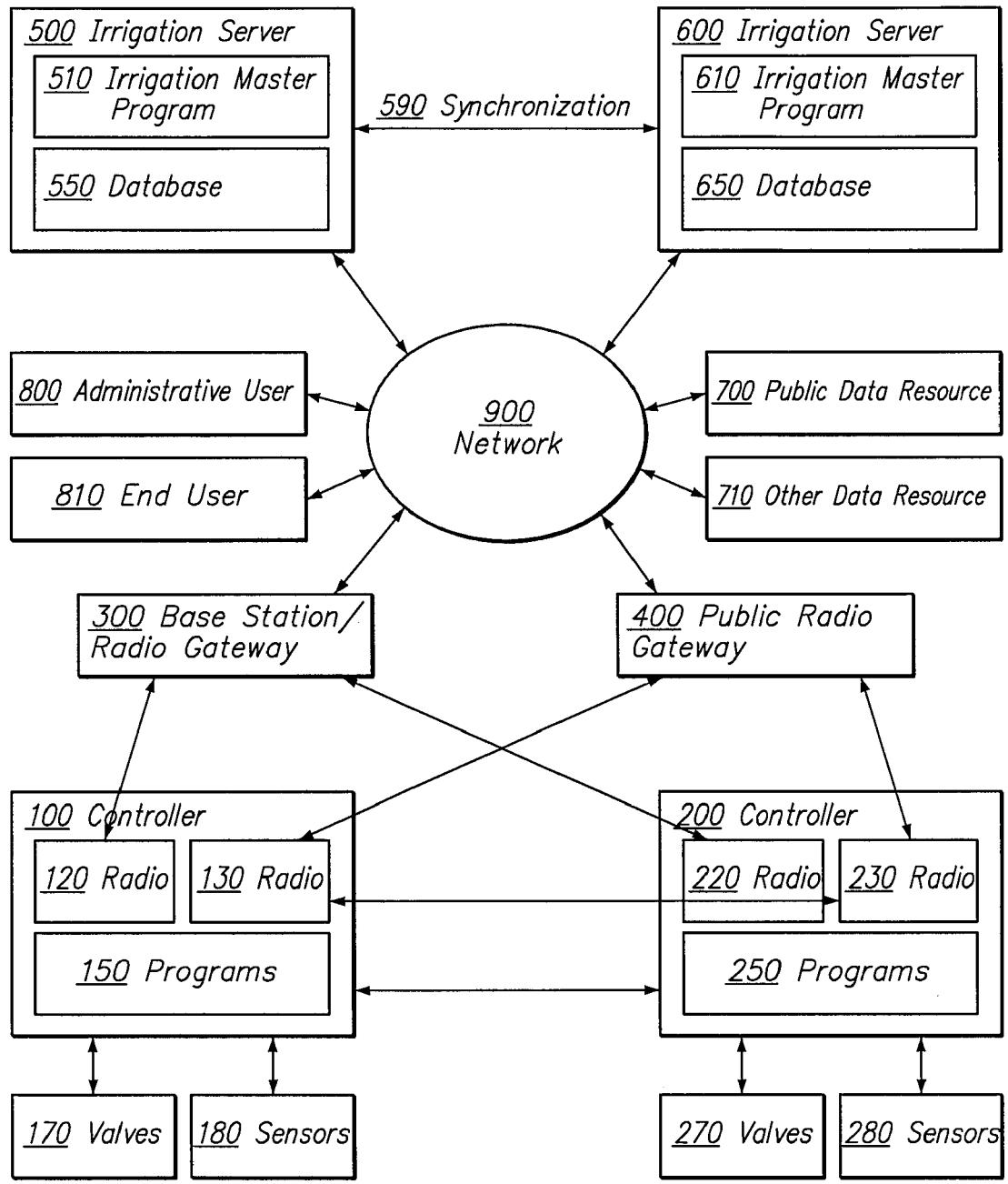
FIG. 1 is a block diagram depicting an example configuration of a fault-tolerant irrigation control system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Approaches, techniques, and mechanisms are disclosed for fault-tolerant systems. According to one embodiment, a node of a fault-tolerant system is responsible for performing various tasks. The node relies upon a primary communication mechanism of a first type, when possible, for communicating with a central server. For example, the node may receive real-time data, such as commands for the node to perform certain tasks, via the primary communication mechanism. The node may also send data, such as feedback or observations, to the server via the primary communication mechanism.

The node monitors its connection to the server via the primary communication mechanism. While the node is connected to the server via the primary communication mechanism, the node operates in a supervised mode, in that it generally does not perform a certain subset of tasks without having received real-time commands from the server to perform those tasks. However, when the node detects that it is no longer connected to the server, the node transitions into a fail-over mode. The node operates in the fail-over mode until the node once again detects that the node is connected to the server via the primary communication mechanism.

According to an embodiment of the invention, a node operating in fail-over mode operates autonomously from the server, in that it no longer requires explicit commands from the server to perform a certain subset of its tasks. While in this fail-over mode, the node executes a stored set of instructions associated with the fail-over mode. The stored set of instructions includes logic that allows the node to determine, without real-time commands from the server, when to execute certain tasks. This logic may be, for example, representative of the logic that the server relies upon for determining when to send commands. This logic may further be conditioned upon data observed by the node or relayed to the node via other still-connected nodes, so that the node can make intelligent decisions about whether or not to take an action.

According to an embodiment, when connected to the server, the node may on occasion receive an updated set of fail-over instructions generated by the server, which the node may then store for execution during occurrences of the fail-over mode. The updated set of instructions may reflect recent changes to data that impacts the server's logic for determining when to send commands to a node. Such data may be data that would be impossible or impractical for the node to observe while executing in fail-over mode. For example, in the context of irrigation systems, the set of instructions may be updated to reflect new irrigation priorities that reflect updated forecast data or historical trends that would otherwise be unavailable to the node when operating autonomously. In this manner, the server is able to maintain some degree of control over the activities of the node even while the node is in fail-over. Furthermore, because the server knows what set of instructions the node is following, the server may predict with some degree of accuracy how the node will act in fail-over mode, and therefore coordinate the activities of other nodes in accordance with this prediction.

According to an embodiment, while operating in fail-over mode, the node may on occasion attempt to establish a backup connection to the server via a backup communication mechanism. The backup communication mechanism is a different type of communication mechanism than the primary communication mechanism. While the backup connection is established, the node may receive data from the server, including commands and updated sets of fail-over instructions.

According to an embodiment, the backup connection is more reliable, but less desirable than the primary connection. For example, the backup communication mechanism may rely on a type of communications that is less power-efficient than relied upon by the primary communication mechanism. Or the backup connection may rely on a network provider with expensive fees. Or the backup connection may only be uni-directional. For whatever reason, it may be impossible or undesirable to maintain the backup connection indefinitely. Therefore, according to an embodiment, the node establishes the backup connection for only short durations—for instance, the amount of time necessary for the node to receive a new set of fail-over instructions. However, the backup connection need not necessarily be more reliable or less desirable.

According to an embodiment, the backup connection need not be a live connection. For example, the server may send data to a relay device at a first time. The node may at a later time connect to the relay device and download the data. According to an embodiment, a node may still be connected to other devices via a primary communication mechanism, even though the node has lost its connection to the server via the primary communication mechanism. For example, only the last leg to the server via the primary network may have failed. According to an embodiment, the node backup communication mechanism may be deployed at a device other than the node, and the node may have access to the backup communication mechanism by proxy through a connection via the primary communication mechanism to that device.

In other aspects, the invention encompasses a computer apparatus and a computer-readable medium configured to carry out the foregoing steps.

2.0. Example Fault-Tolerant System

The disclosed techniques may be useful to provide fault-tolerance in a variety of systems with potentially unreliable communications. One such system is a wireless irrigation system. Various details of the disclosed techniques are therefore discussed below in the context of a wireless irrigation system. However, the details and techniques may be extended or applied to other types of systems as well, with little or no modification. Thus, for example, techniques discussed below for an "irrigation controller" that performs certain irrigation functions in response to commands from a server should be understood to apply, generally speaking, to any node of any system that is used to perform a certain set of tasks in response to commands from a server.

2.1. Failures in Irrigation-Control Systems

Water is an increasingly important and scarce resource as population grows and the need for water for drinking, household, and irrigation purposes increases. Irrigation in particular is one of the most important uses of water. In some regions, irrigation accounts for more than 80% of water withdrawals. Accordingly, the efficiency of irrigation is of the utmost importance. Irrigation can be as crude as flooding, still widely in use for instance in California, or more refined in the form of drip irrigation. No matter the type of irrigation used, however, effective and efficient control of such irrigation ultimately determines the total water used.

Control of irrigation is also important for other purposes than minimizing use of water. For example, more intelligent dosing of irrigation can induce a slight stress on plants, leading to more intense fruit quality, in turn leading to higher prices. Yet other benefits are possible when irrigation is used to mitigate environmental risks to crops, such as frost, excessive heat, or plant disease. In these cases, irrigation control systems can help by providing a fast response to changes in factors such as temperature.

A simple form of irrigation control is the irrigation timer, a device that turns a valve on and off according to a preset schedule. Irrigation timers are non-intelligent, in that they rigidly adhere to their schedules regardless of any external factors. Irrigation timers are also non-connected, in that a user must be in the physical presence of an irrigation timer to adjust its schedule.

Another form of irrigation control is the wireless irrigation control, wherein each valve is controlled by a "wireless node." A wireless irrigation controller typically is a small solar and battery-powered micro-computer with an associated radio modem. Each wireless irrigation controller is networked either directly to a base station or via each other back to such a base station ("mesh networking"). Wireless irrigation controllers provide the benefit of not having to run cables in the ground, both saving costs and eliminating failures from cut or shorted wires. Wireless irrigation controllers are discussed, for example, in U.S. Pat. No. 6,782, 310, the entire contents of which are incorporated herein by reference for all purposes, as if set forth in their entirety.

Another form of irrigation control is intelligent irrigation control, wherein decentralized controllers of each valve receive updates to their irrigation schedules via some form of network from a central server, such as an Internet server. Because the central server can have access to vast amount of information relevant for irrigation, such as weather forecasts or other sensor data collected in the areas of interest, it can make more intelligent decisions regarding water schedules and pass commands reflecting those decisions on to the valve controllers for execution. Intelligent irrigation controllers are discussed, for example, in U.S. Pat. No. 6,823,239, the entire contents of which are incorporated herein by reference for all purposes, as if set forth in their entirety.

Various other techniques for irrigation systems include the use of mesh networking for sensor data collection in irrigation systems (but not for irrigation valve control), as described in "Real-Time Monitoring of Crop Canopy Temperatures in An Agricultural Field Using a Wireless Mesh Network of Infrared Thermocouple Sensors," by Oshaughnessy, et al., available at the time of writing at http://www.ars.usda.gov/research/publications/Publications.htm?seq_no_115=217919, the entire contents of which are incorporated herein by reference, as if set forth in their entirety. The use of mesh networking of valve controllers is described in "Precision Irrigation in Landscapes by Wireless Network" by Delwiche, et al., available at the time of writing at http://groups.ucanr.

org/slosson/documents/2006-200712577.pdf, the entire contents of which are incorporated herein by reference, as if set forth in their entirety. Note that all controllers discussed by Delwiche have one type of radio, and that only simple schedules downloaded to controllers are envisioned.

All of these forms of irrigation control are quite limited in the area of fault-tolerance, in that irrigation systems resulting from these forms of irrigation control are prone to certain failures that may completely offset the benefits of these forms of irrigation control (or even create disastrous problems because the owner expected the system to work). These failures result from, among other problems, problems such as described below.

First, wireless irrigation control systems are dependent on the deployment of sufficient nodes to make the network "hang together". As the number of nodes increases, the relaying of data through multiple nodes increases the risk of failure, unless even more nodes are deployed for redundancy. Even if nodes communicate directly with central server, the signal may receive interference or a plant may grow to block the signal during the growing season, making the system fail.

Second, other wireless technologies with better ranges, such as cellular, 802.11, or various UHF technologies, have the disadvantages of consuming too much power, requiring oversized batteries and solar panels, and, in some cases, requiring network provider fees. This disadvantage makes controllers based on such technologies less desirable and more expensive, without in many cases removing the first fundamental problem discussed above.

Third, all intelligence for intelligent irrigation control systems is located in the central server, rendering the individual valve controllers "dumb" when their connection fails due to, for example, the problems outlined above.

Fourth, intelligent irrigation control systems may fail if the central server, e.g. an Internet-based server, fails for whatever reason.

Fifth, if any of the problems above occur, current systems are also likely to fail to alert the users of the system about this failure. If, for example, a controller fails to close a valve, and a radio connection to the central server is not available, the central server cannot communicate this failure to the user.

2.2. Fault-Tolerant Wireless Irrigation System

To overcome these and other problems in irrigation control systems, a fault-tolerant irrigation system may rely on one or more of the following techniques.

First, controllers may feature more than one communication mechanism, each mechanism having a separate path to a central server. For example, the system may feature multiple radio systems, each used interchangeably and opportunistically to continue intelligent irrigation control, even as one or more radio systems fail. One strategy for using said multiple radio systems involves each controller using its best working radio system to communicate between the server and the controller. If the preferred (e.g. lowest cost) radio system fails, the next-best radio will be used, and so forth. A more complex strategy for using the multiple radios involves the use of combinations of radio systems to communicate. If, for example, neither radio system is able to provide a connection between a server and given controller, it may be possible to reach another controller by one radio system which may in turn reach the desired controller via another radio system.

Second, controllers may utilize stored irrigation programs (as opposed to simple irrigation schedules), that include logic capable of making intelligent irrigation control decisions even if communication to the central server fails. If, for example, the connection between a server and controller X fails, and controller X has stored within itself a program with logic to stop irrigation during rain, controller X may obtain information that indicates rain from one of its own sensors (or from a controller Y that has a rain sensor, to which controller X is still connected via a mesh network) and shut off irrigation, even if the server is unavailable at the time. Such programs are not fixed, but updated regularly from a central server, to reflect the central intelligence of the system. According to an embodiment, these programs may be in a Turing-complete language.

Third, there may be more than one central server available to control the irrigation system and communicate with controllers. If one server fails, a controller can communicate with the other server. The two servers mutually keep each other synchronized and agree on which server is "master" at any given time.

Fourth, the system may employ one or multiple schemes to communicate failures to users, enabling users to respond manually to such failures. If, for example, a controller fails to close a valve, but is without means of communicating to the central server, the controller may use its cellular radio system to send an alert directly to users. Or, if the controller is not itself equipped with a radio capable of sending such an alert, the controller may relay the alert through another still-connected controller capable of sending such an alert. As another example, a controller might trigger a visual or audible alarm at a device that is present at the site of irrigation and connected to the controller via a radio system, even when the no connection with the central server is possible.

2.3. System Configuration

FIG. 1 is a block diagram depicting an example configuration of a fault-tolerant irrigation control system 50, according to an embodiment of the invention. Although system 50 is depicted as comprising various components with various features, system 50 may also be implemented with only some of these components, or with components having a lesser or greater set of features.

System 50 comprises a number of controllers 100 and 200 that are capable of taking some mechanical or electrical action in response to irrigation commands, such as opening or closing a connected irrigation valve. Controllers 100 and 200 feature, respectively, primary communication mechanisms 120 and 130 and backup communication mechanisms 220 and 230, which in the depicted embodiment are two different types of radios. Controllers 100 and 200 further feature, respectively, storage mechanisms 130 and 230 for storing sets of instructions in the form of irrigation programs. Controllers 100 and 200 are directly connected to and control the physical operation of, respectively, valves 170 and 270. Controllers 100 and 200 are further directly connected to and read data directly from, respectively, sensors 180 and 280.

System 50 further comprises central irrigation servers 500 and 600, wherein the overall programming of the system is controlled. However, system 50 can also function with just one irrigation server 500 or 600. Servers 500 and 600 are managed via web browsers (or other client applications) by administrative users 800, having administrative rights, and normal end users 810. Users 800 and 810 may have access to servers 500 and 600 via a network 900, such as the Internet, or a direct terminal.

Servers 500 and 600 are further connected via network 900 to public data sources 700, such as weather forecast data, precipitation histories, and data indicating historical weather trends. Servers 500 and 600 may access these data sources as input in deciding when to send commands to controllers 100 and 200, as well as when preparing irrigation programs to send to controllers 100 or 200. Servers 500 and 600 may further rely on other data resources 710 for these activities, such as Farm Management Information Systems (MIS) data about the crops and fields under irrigation.

System 50 further comprises a synchronization mechanism 590 between servers 500 and 600. However, such a synchronization mechanism 590 may be optional if system 50 comprises only one of servers 500 or 600, or if servers 500 and 600 rely on a shared database.

In response to executing, respectively, irrigation master programs 510 and 610, servers 500 and 600 send irrigation commands to controllers 100 and 200. In response to executing, respectively, irrigation master programs 510 and 610, servers 500 and 600 may further send irrigation programs via base station 300 to be stored at controllers 100 and 200. These irrigation programs may reflect, for instance, the logic of irrigation master programs 510 and 610 in view of data from data sources 700 and 710. Servers 500 and 600 further feature, respectively, databases 550 and 650.

System 50 further comprises at least one base station 300, which may be for instance a radio gateway located within radio connectivity range of at least one of controllers 100 or 200. Base station 300 acts as a conduit for information flow between server 500 or 600 and the connected controllers 100 or 200. Communication mechanisms 120 and 220 of controllers 100 and 200 may be utilized for communication with base station 300. Base station 300 may be connected to server 500 or 600 through network 900 or any other network. Base station 300 may be optional where controllers 100 and 200 have direct connection to server 500 or 600.

System 50 may further rely on a public radio gateway 400 for communication between servers 500 or 600 and controllers 100 and 200 without going through base station 300, especially when base station 300 may be the cause of a failure.

2.4. Network Connectivity

The primary connectivity between base station 300 and server 500 or 600 may be provided by a wide variety of networks, including, but not limited to a public cellular network, the Internet, and a regular phone line, to name a few. The primary connectivity between base station 300 and controllers 100 and 200 may be provided by an equally wide variety of networks, including, but not limited to a "mesh network", using such radio protocols as IEEE 802.15 and networking protocols such as ZigBee, or a simpler hub-and-spoke model as often seen with 900 Mhz unlicensed radios. Moreover, controllers 100 and 200 may be primarily connected to each other or directly to servers 500 or 600 through any of the example networks discussed above, as well as any other network suitable for connectivity.

Since connections via communication networks such as those discussed above are often not 100% reliable due to the many types of failures discussed throughout this application, controllers 100 and 200 may further rely on public radio gateway 400 for backup connections while a primary connection remains down. Public radio gateway 400 may be, for example, a satellite system, another cellular system (e.g. analog cellular), or even another base station operating only as a failover radio gateway. In fact, public radio gateway 400 may rely on any network suitable for connectivity while a primary connection remains down, including other network types discussed above as being useful for the primary connection.

2.5. Irrigation Server

Figure 2:
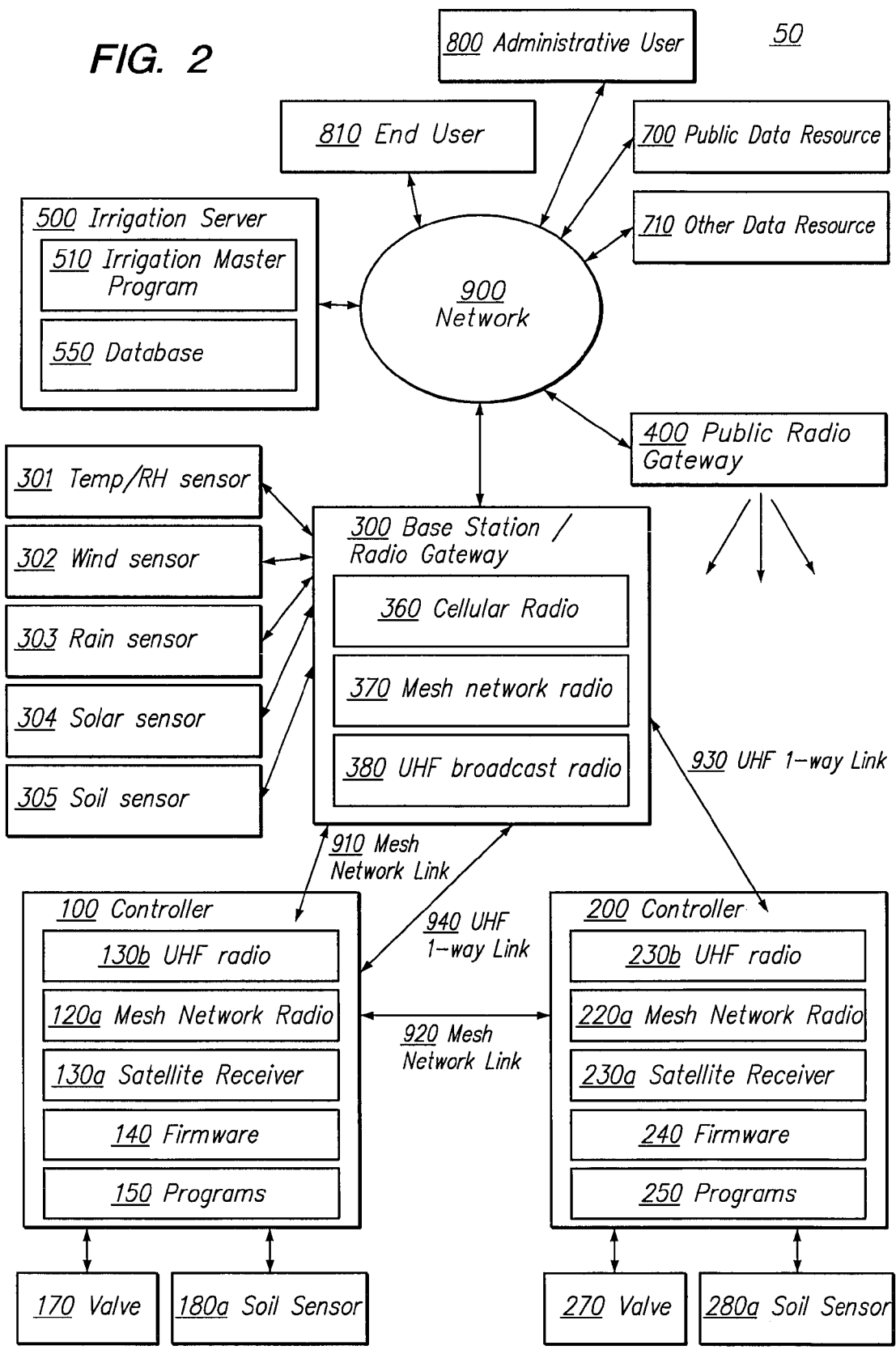
FIG. 2 is block diagram illustrating further details of the example fault-tolerant irrigation control system, according to an embodiment of the invention.

FIG. 2 is block diagram illustrating further details of example fault-tolerant irrigation control system 50, according to an embodiment of the invention. Again, although system 50 is depicted as comprising various components with various features, system 50 may also be implemented with only some of these components, with components having a lesser or greater set of features, or with components have different features than those depicted.

Server 500 is a device accessible via network 900 to a variety of users authorized to monitor and/or control irrigation at an irrigation property in which system 50 has been deployed. Server 500 comprises at least a CPU, memory, and a database 550 wherein is stored the data gathered from sensors attached to connected controllers (including data about irrigation valve control action), as well as irrigation programs in a format downloadable to each controller. In generating these irrigation programs, server 500 draws on data in database 550 concerning the history of the irrigated property itself, public data from public data source 700, such as macro weather data indicating weather beyond property boundaries, as well as data from other data resources 710, such as farm MIS data from the property under irrigation, indicating crop types, crop maps, and soil quality maps. Server 500 also contains irrigation master program 510, which uses a variety of algorithms to determine the correct irrigation schedule for each controller and valve.

Figure 3:
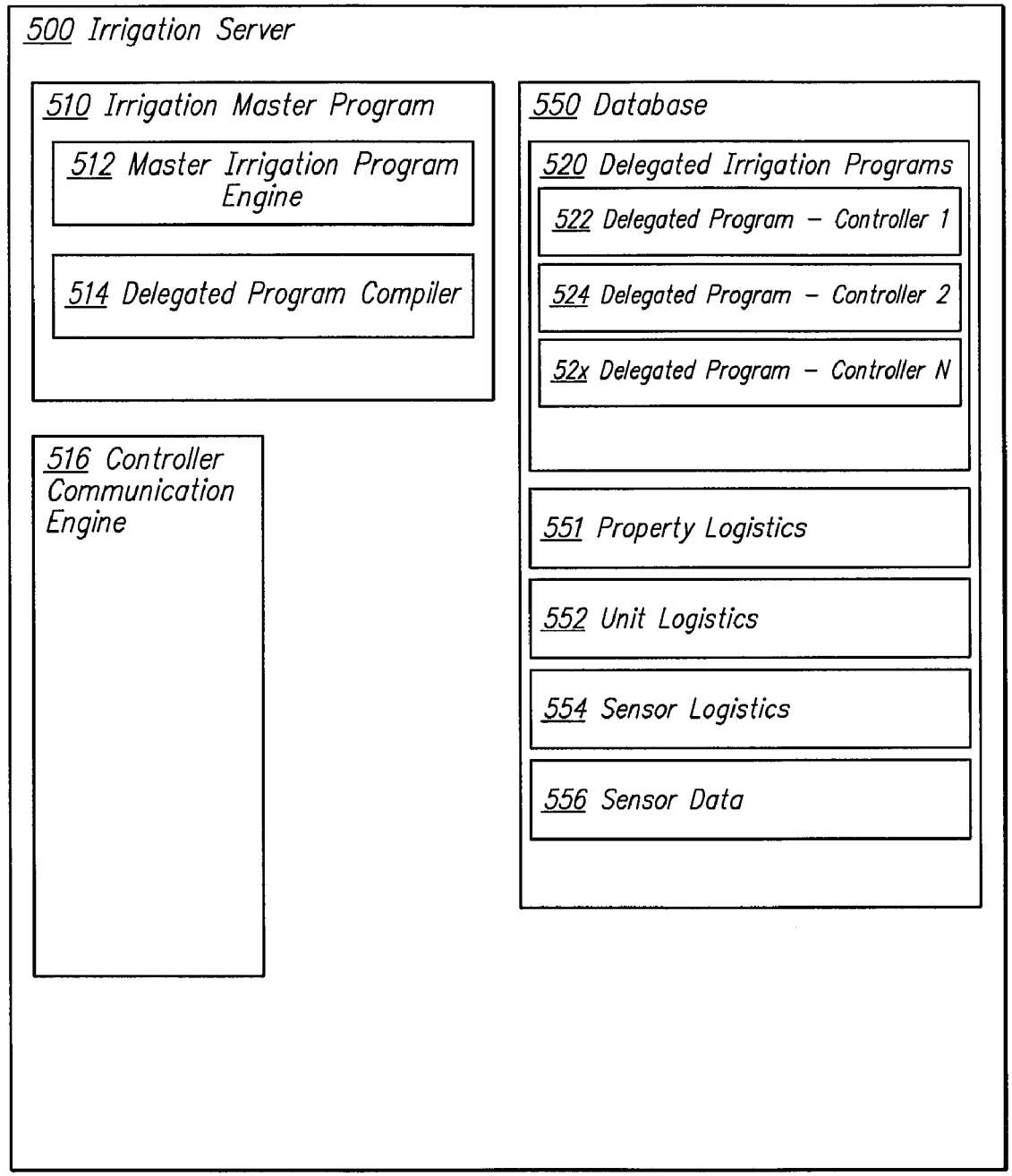
FIG. 3 is a block diagram depicting an example irrigation server, according to an embodiment of the invention.

FIG. 3 is a block diagram depicting an example irrigation server 500, according to an embodiment of the invention. Database 550 of server 500 includes, among other data, data 551 indicating property logistics, data 552 indicating unit logistics, including the types and locations of base stations and controllers, data 554 indicating sensor logistics, including the types and locations of sensors deployed at the various units indicated in data 552, and data 556 indicating sensor data that has been collected from the various units indicated in data 552. Sensor data 556 may be in the form of, for instance, time-series data.

Irrigation master program 510 of server 500 comprises a master irrigation program engine 512, which runs at regular intervals and analyzes all available sources of data, such as sensor data 556, public weather data, such as a weather forecast from public data source 700, and farm specific MIS data such as stored in other data resources 710. Based on this information, engine 512 makes irrigation decisions in real time. For example, engine 512 may determine that the latest soil moisture data gathered from sensors 180 connected to controller 100 indicates a deficit of water in the location at which controller 100 is deployed. Accordingly, engine 512 may cause the server 500 to send a command to controller 100 to turn on irrigation valves 170. Alternatively, engine 512 might factor into the equation that public data source 700 indicates a projected rainfall today, and that water budget data in the Farm MIS data of other data resources 710 indicates a severe shortage of water overall. Engine 512 may thus decide not to send such an irrigation valve control command. This irrigation programming is inherently more complex than possible on a controller not connected to public data resources and lacking significant computing resources.

The irrigation master program 510 further periodically (or on user demand) invokes a delegated program compiler 514 to produce a set of future irrigation control instructions for a particular controller (hereinafter referred to as a program or delegated program). This program represents irrigation master program 510's best possible approximation of how engine 512 would control irrigation at the particular controller for a potentially infinite time into the future, given the information available to engine 512 at this time. This program might be as simple as a loop repeating on a daily or weekly basis with a sequence of "on" and "off" commands, or it may be as complex as multiple algorithms taking into account sensors attached to the local controller to assist in local decision making. Irrigation master program 510 produces these delegated irrigation programs 520 for each of a number of controllers, thus producing delegated programs 522, 524, and on through delegated program 52x.

Once a delegated program is generated it may be compiled into byte code readily executable by the particular controller. The delegated program may then be stored in database 550 as a pending delegated program. Any existing delegated program in database 550 is not replaced by a pending delegated program until positive confirmation is received from the relevant controller that the pending delegated program has been received. In other words, database 550 generally has two delegated programs stored for each controller: the last confirmed downloaded, and the latest generated.

The master irrigation program 510 may send irrigation commands, such as a command to turn a valve on or off, as well as pending delegated programs, to controllers via controller communication engine 516. Commands and pending delegated programs may be sent separately or combined together. For example, a command and/or a pending delegated program may be wrapped within one or more Irrigation Controller Update Packets (ICUP) and transmitted to the controller communications engine 516, from which the ICUP may be relayed to the relevant controller. The communications engine 516 first attempts to forward data to the controller via the primary connection (e.g. via the base station 300). However, if no confirmation of receipt is received from the controller, communications engine 516 enters into failover mode for that controller after a programmable "grace period."

While in failover mode, unit logistic data 552 in database 550 is inspected to determine the specific secondary radio capability of the non-responding controller. The data may then be re-transmitted to the non-responding controller via, for instance, public radio gateway 400. According to an embodiment, the data may be relayed according to a timing protocol described under the "Controller Firmware" section below. In some embodiments, the public radio gateway 400 may rely on a messaging-based network (such as cellular text messaging), and in such case the communications engine 516 will simply deliver the data to the public gateway for delivery to the controller at the earliest possible time.

Since different controllers may have different types of secondary radios, and since two controllers may be able to communicate with each other even in failover mode, the communications engine 516 may also duplicate the transmission to controllers adjacent to the non-responding controller, along with information about ultimate destination of the transmission, in the hopes that the adjacent controller may still be connected (via, for instance, a secondary radio), and that the adjacent controller can then forward the data to the non-responding controller, if possible.

According to an embodiment of the invention, even as this failover mode persists, the irrigation master program 510 continues to determine commands to send to and/or create updated delegated programs 520 for the non-responding program. The irrigation master program 510 may use in its calculations the assumption that the non-responding controller is now operating according to the set of instructions communicated to the non-responding controller in the last confirmed downloaded delegated program. The irrigation master program 510 may also use in its calculations a probability that a previously generated, but not confirmed, program has been received by the non-responding controller. The irrigation master program 510 continues to attempt to send the updated programs via the communications engine 516, as outlined above, even while in failover mode for the controller.

2.6. Controllers

Figure 4:
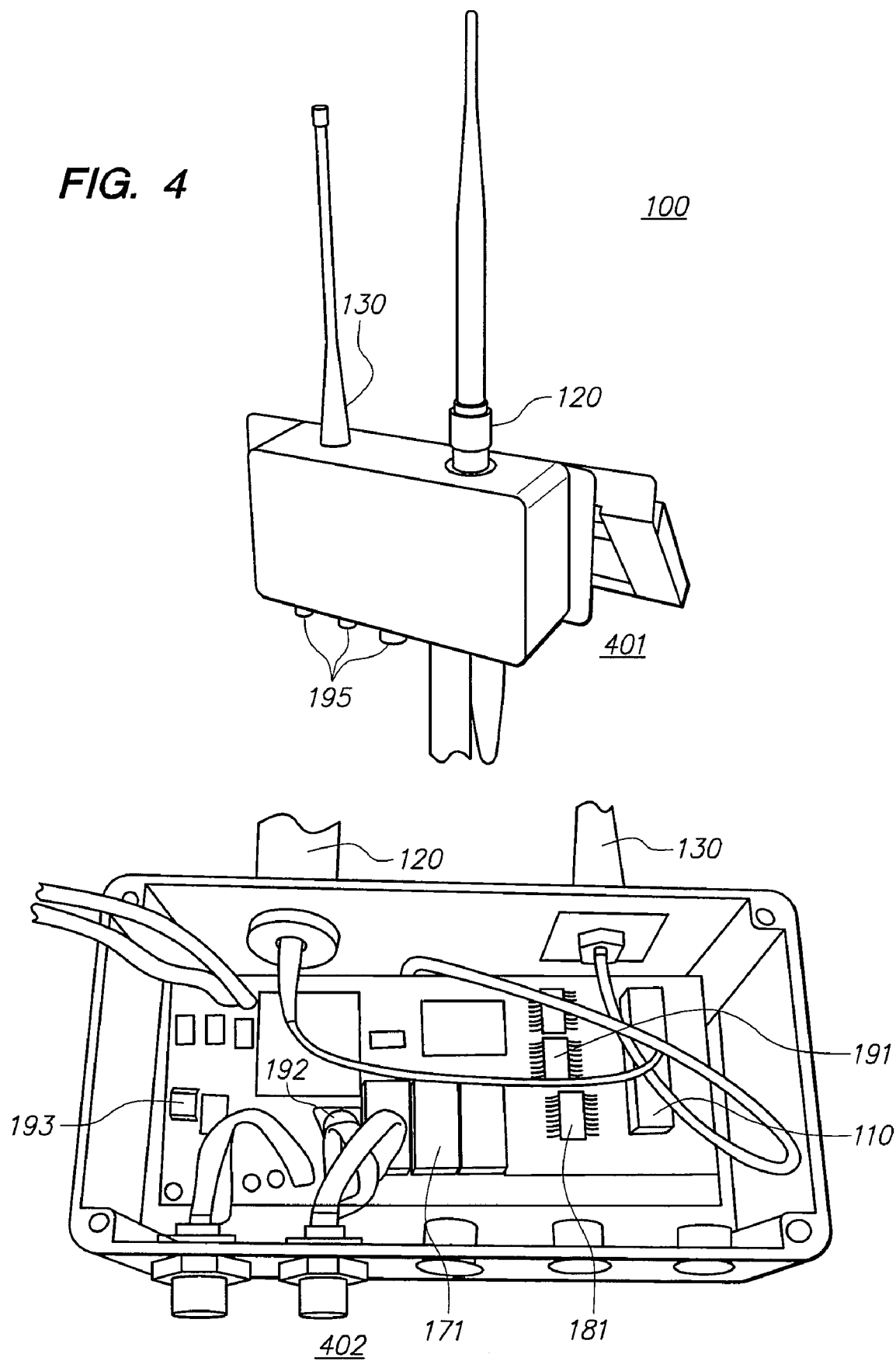
FIG. 4 depicts an example controller, according to an embodiment of the invention.

FIG. 4 depicts an example controller 100, according to an embodiment of the invention. View 401 depicts its outer appearance. View 402 depicts its interior appearance, including a CPU 110, memory 191, battery 192, solar charge controller 193, relays to control valves 171, sensor reading circuitry 181, along with ports 195 to connect valves and sensors. Controller 100 also comprises at least two means of communication: primary communication mechanism 120 to reach base station 300 (e.g. a IEEE 802.15 modem and antenna) and backup communication mechanism 130 for failover communications (e.g. a UHF signal received from base station 300, without use of the mesh network).

Returning now to FIG. 2, controllers 100 and 200 may more specifically comprise mesh network radios 120a and 220a, respectively, which are example communication mechanisms 120 or 220. As depicted, radios 120a/220a connects controller 100 to controller 200 via mesh network link 920. As depicted, radio 120a connects controller 100 to base station 300 via mesh network link 910. Mesh network radios 120a/220a are considered primary communication mechanisms for connecting to server 500 (possibly via base station 300 and other controllers). Among the many reasons why mesh network radios 120a/220a may have been selected as primary communication mechanisms are their low power consumption rates and the lack of subscriber access fees for the mesh network in which radios 120a/220a operate. While similar reasons may guide the choice of other types of radios as a primary communication mechanisms 120/220, any other communication mechanism may also or instead be used a primary communication mechanism, so long as the communication mechanisms allows its controller to receive communications from server 500 in near real-time. In fact, primary communication mechanisms 120/220 may each be of different radio types.

Controllers 100 and 200 also each comprise a satellite receiver 130a or 230a, and/or a UHF radio 130b or 230b, all of which facilitate backup connections for receiving data from server 500 when no connection may be established to server 500 via radios 120a/220a. Satellite receivers 130a and 230a may receive communications from, for example, a satellite serving as public radio gateway 400. UHF radios 130b and 230b may be connected to base station 300 via UHF 1-way links 930 and 940, respectively. In both cases receivers 130a and 230a and UHF radios 130b and 230b are examples of backup communication mechanisms 130 and 230. Each may have been selected as a backup communication mechanism for a variety of reasons, including their high reliability, but high power consumption and/or network provider fees, as well as their uni-directional nature (meaning that a controller cannot respond to server 500 via these mechanisms). However, other backup communication mechanisms may be selected for the same or different reasons. Moreover, a controller may include more or less than two backup communication mechanisms. Controllers 100 and 200 may be designed to turn on these backup communication mechanisms only for short periods while in failover mode, to avoid over-utilization of power and/or high network fees.

Controllers 100 and 200 also each comprise a firmware 140 or 240, which is the main program for running the controller, as described in the next section. Controllers 100 and 200 also each comprise a storage mechanism 150 for storing one or more programs (the "delegated programs") downloaded from server 500 or 600 on a regular basis, providing controllers 100 and 200 with irrigation logic in the case of communications failure.

Overall, controllers 100 and 200 each perform one or more of the following functions: 1) reads values from attached sensors 180 (e.g. soil sensors 180 and 280); 2) actuates another device, typically a valve such as valves 170 or 270 equipped with a DC latching solenoid; 3) routes information between other controllers; 4) comprises and executes one or more delegated irrigation programs; 5) has one or more radio systems to communicate with servers 500 or 600, base station 300, or other controllers; and 6) intelligently decides on irrigation valve actuations based on the logic described below under "firmware".

2.7. Controller Firmware

Execution of firmware 140 or 240 causes controllers 100 and 200 to perform a variety of functions, including but not limited to, the functions described below with respect to firmware 140.

First, execution of firmware 140 causes controller 100 to take regular samplings of sensor data from attached sensors 180. As depicted in FIG. 2, one such sensor 180 may be a soil moisture sensor 180*a*, but sensors 180 could also or instead include any or all of temperature, wind, solar, or any other types of sensor.

Second, execution of firmware 140 causes controller 100 to attempt to establish and maintain an open communication link to one of servers 500 or 600. For example, execution of firmware 140 may cause controller 100 to create a connection to server 100 through the primary communication mechanism 120—in this case, mesh network radio 120*a*—via base station 300.

Third, through the established communication link (i.e. connection), execution of firmware 140 causes controller 100 to send sensor data from sensors 180 as available, as well as to accept commands and other data from the connected server 500 or 600. For example, through the connection, controller 100 may receive commands in the form of a packet of ASCII text that indicates an instruction to controller 100 to turn a valve 170 on or off. Commands and other data received from or sent to servers 500 or 600 may be protected by checksums and retransmitted until the checksum is validated.

Fourth, execution of firmware 140 causes controller 100 to perform an action in response to received commands or other data. For example, controller 100 may open or close a valve 170 in response to a command from server 500. In response to new programs received from server 500, controller 100 may store a stored program in its storage mechanism 150.

Fifth, execution of firmware 140 causes controller 100 to send a confirmation to server 500 or 600 that a command received from server 500 or 600 has been executed (e.g. that a valve 170 has been successfully opened, or that a delegated program has been successfully stored in storage mechanism 150).

Sixth, execution of firmware 140 causes controller 100 to monitor an established primary communication link to servers 500 or 600 for failure. When the duration of a communications failure exceeds a critical limit, firmware 140 causes controller 100 to switch from its normal mode of operation to a fail-over mode of operation dictated by the most recently received and appropriate delegated program. While in this fail-over mode, controller 100 will execute the delegated program to determine which commands server 500 or 600 would have sent to controller 100, based on the data most recently available to server 500 or 600 when the delegated program was generated, as well as when controller 100 should execute those commands. The program may be as simple as a sequence of valve 170 activations (on or off) at particular times every day, which is to be followed until the communication link is re-established. Or the program may be more complex, for instance including logic in accordance with which controller 100 monitors attached soil sensor 180*a* and turns irrigation valve 170 on or off based on data received from that sensor.

Seventh, when in failover mode, execution of firmware 140 causes controller 100 to, at certain points in time, turn on a backup communication mechanism 130 and attempt to establish a backup connection to servers 500 or 600. Backup connections via a backup communication mechanism 130 are typically less attractive than primary connections, in that they consume too much power to be active all the time, have higher associated communications costs, or are only one-way, meaning that servers 500 and 600 cannot receive confirmation of commands and received data. As such, backup communication mechanisms may be unattractive for permanent use, but since failures are assumed to be rare, still useful for connections while controller 100 is in fail-over mode.

For example, backup communication mechanism 130 may be satellite receiver 130*a*, which does not enable transmission back to servers 500 and 600, may consume more power than mesh network radio 120*a*, and is likely more costly than mesh network radio 120*a*, as satellite communications are typically charged per byte. However, satellite receiver 130*a* enables controller 100 to, on occasions, connect to server 500 or 600 and receive an updated irrigation programs, even though controller 100 is still in fail-over mode. For instance, controller 100 and server 500 may have previously agreed upon a certain time for establishing a backup connection, such as the first five minutes of each hour. At each full hour, server 500 will start broadcasting the updated program via satellite a certain number of times, and controller 100 will similarly turn on satellite receiver 130*a* at that time and listen until a new valid program (verified by checksum) is received.

Finally, when in failover mode, execution of firmware 140 causes controller 100 to at certain times attempt to re-establish a primary communication link via the primary communication mechanism 120. When the primary server link is re-established, controller 100 returns to normal mode and ceases to execute the delegated program.

2.8. Delegated Programs

Controllers 100 and 200 each store at least one delegated program. Each program represents logic from server 500 or 600, at the time the program was generated, for determining when and how much the respective controller should irrigate over a set or possibly infinite time into the future. The logic is further based on data available to server 500 or 600 that might not be readily available to controllers 100 or 200. For example, strategies implemented by the logic could reflect forecast data for the next week, and thus provide controllers 100 or 200 with, effectively, a weather forecast. The program may further contain logic that allows controllers 100 or 200 to intelligently adapt to changes observed in other data to which controllers 100 or 200 may still have access even while in fail-over mode—e.g. sensor data from sensors 180/280, as well as from other controllers that may advertise their sensor data over the mesh network.

As mentioned above, controllers 100 or 200 may, in some embodiments, store more than one delegated program. In such embodiments, controllers 100 or 200 may execute multiple delegated programs at the same time, or may selectively choose to execute some delegated programs at one time, and other delegated programs at other times, depending on, for example, the time, the date, and observations from sensor data.

Controllers 100 and 200 will execute some or all their stored programs if connectivity to servers 500 or 600 fails, and continue to execute stored programs until either connection to server 500 or 600 is re-established or a more recent program is received via a backup communication mechanism 130 or 230 (e.g. satellite broadcast 130a or 230a). Servers 500 and 600 update delegated programs frequently, as relevant new information becomes available from, for example, data sources 700.

The delegated program may be in any form capable of interpretation or execution by CPUs 110 or 210 of controllers 100 or 200. For example, the delegated program may be executable code compiled from a Turing-complete language, such as Java, Javascript, or C, meaning that except for memory size and CPU power limitations, the delegated program may implement any reasonably conceivable algorithm. In other implementations, the language used for the delegated program could be less powerful, even as simple as a textual or XML time-based programming schedule.

EXAMPLE OF A DELEGATED PROGRAM

To illustrate the delegated program mechanism, it is helpful to look at a practical scenario. Assume, for example, that on Monday, August 3$^{rd}$, at 06:00, the following new information is available to the servers 500 and 600 in public data source 700:

Weather forecast for Tulare, Calif.:
Monday: 20% chance of rain
Tuesday: 40% chance of rain
Wednesday: 0% chance of rain
Thursday: 0% chance of rain
Friday: 0% chance of rain In this scenario, controller 100 is operating in connected mode (i.e. has a connection to server 500 or 600), and attached soil sensor 180a is reporting 20% soil moisture. Temperature on the site of controller 100 is reported by other controllers (having thermometer sensors) as 50 degrees Fahrenheit. Yet another controller (having a water gauge sensor) reports the water level in a nearby reservoir to be 5 feet.

Furthermore, in this scenario, the Farm MIS info from other data resource 710 indicates that the crop planted near controller 100 is a high end vine grape, for which a user 810 has specified to server 500 or 600 a preference for a regime of deficit irrigation (i.e. irrigating as little as possible to induce mild stress on vines to produce more intense fruit, leading to better wine, along with water conservation). Based on historical water level data for the above-mentioned reservoir, server 500 or 600 may also observe that the reservoir level is lower than average for this time of year.

Based on the afore-described scenario, server 500 or 600 may be programmed to conclude that water conservation is a high priority (due to the low reservoir level). Since there is a probability of rain in the near future, server 500 or 600 may decide to generate a delegated program for controller 100 that will cause controller 100 not to irrigate Monday-Thursday, since there is probability of rain for the next few days, and any rain received on those days would keep enough moisture in the soil to last until Thursday. Moreover, server 500 or 600 may generate the delegated program to cause controller 100 to apply a certain amount of water for 3.5 hours starting at 03:00 on Thursday, based on statistics that indicate that the soil will require that certain amount to maintain a desired moisture level.

However, server 500 or 600 might tweak this program somewhat by running a risk analysis. Various alternative scenarios are run, such as "what if the rain does not fall on Monday or Tuesday as forecast?" Since the current soil moisture is in the low range of 20%, server 500 or 600 may conclude that damage will occur to the vines if no rain or irrigation has arrived by Wednesday morning. As a result, server 500 or 600 may re-arrange the program to include logic that will cause controller 100 to apply irrigation whenever soil sensor 180a indicates that soil moisture has fallen below 15%. Note that server 500 or 600 would not want to generate a program based only on the soil moisture logic, as soil moisture at sensor 180a may not be representative of the entire root zone, and so it is more desirable to follow a certain deep wetting pattern if this pattern can be followed without risking that the soil will become to dry. Thus, controller 100 benefits from the ability to be able to run complex, Turing-complete programs that can support multiple, condition-based irrigation strategies.

Several more iterations of improving the program may also be performed, based on the available data. According to an embodiment, a scoring algorithm may be used to assign risk-adjusted values to the various strategies embodied in the final program. The logic of the program may be formulated to cause controller 100 to perform those strateg(ies) that score highest, given the knowledge available to controller 100.

According to an embodiment, the final program might look like this:

```
int smLowEvent( ) {
    float f;
    f = portRead(3);
    if (f<15) return true;
    return false;
}
smem( ) = createEventMonitor(smLowEvent);
                                      // create soil moisture low event monitor
while (slot=nextSlot( )) {            // wait for next time slot
                                      (1 minutes intervals)
    if (smem( )) {                    // if soil moisture turning low..
        valve(1, ON);                 // turn on valve
        eventYield(smem( ));          // clear event
    }
    if (!smem( )) {                   // if soil moisture turning back high.
        valve(1, OFF);                // turn off valve
        eventYield(smem( ));          // clear event
    }
    if (slotEquals(slot,"2009/08/06 03:00")) { // if it is 3am Wednesday
        valve(1, ON);                 // turn on valve
        slotYield(slot);              // yield remainder of this timeslot
    }
    if (slotEquals(slot,"2009/08/06 06:30")) { // 3.5 hrs later
        valve(1, OFF);                // turn off valve
        slotYield(slot);              // yield remainder of this timeslot
    }
}
```

In this example, the programming language is a C-style script, which can be compiled to byte code for smaller size during transfer and for more efficient execution at controller 100.

2.9. Base Stations

Figure 5:
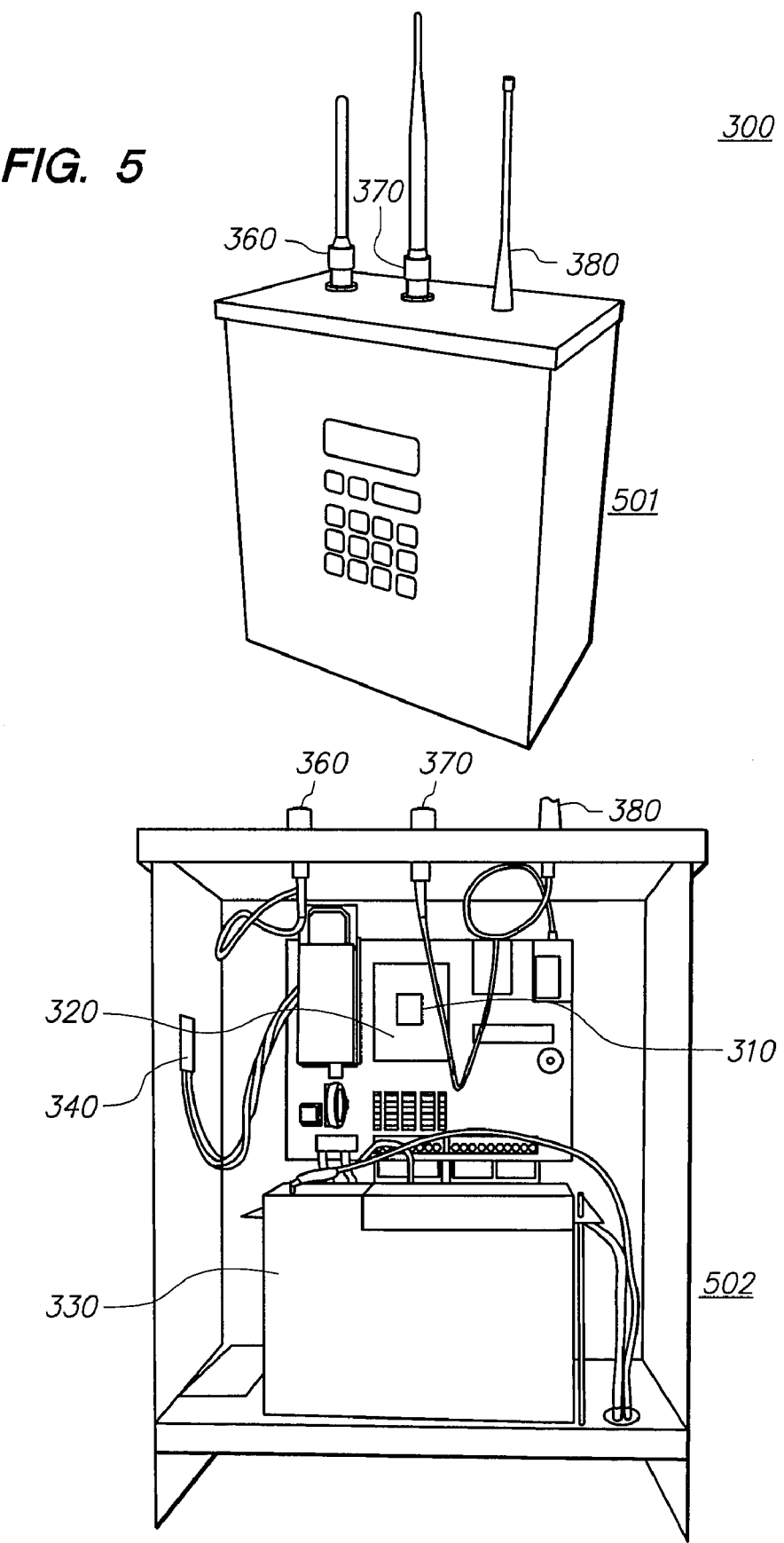
FIG. 5 depicts an example base station, according to an embodiment of the invention.

FIG. 5 depicts an example base station 300, according to an embodiment of the invention. View 501 depicts its outer appearance. View 502 depicts its interior appearance, including CPU 310, memory 320, battery 330, solar charge controller 340, along with at least two means of communication: communication mechanism 360 to reach the central server (e.g. a cellular modem and antenna), and communication mechanism 370 to reach controllers (e.g. a IEEE 802.15 modem and antenna). This depicted unit also includes a third communication mechanism 380 to transmit UHF signals for the failover radio system. This third antenna may not be necessary in a system where backup communications are already facilitated by public radio gateway 400.

Returning now to FIG. 2, base station 300 may more specifically comprises a cellular radio 360a for connecting via network 900 to server 500 or 600, and for relaying data between server 500 or 600 and controllers 100 and 200. However other communication mechanisms may also be utilized for these purposes. Moreover, base station 300 is an optional component of system 50, and controllers 100 and 200 may instead feature communication mechanisms 120 capable of direct connection to network 900 and/or server 500 or 600.

Base station 300 also comprises a mesh network radio 370a for primary communications with controllers. When possible, base station 300 will relay data from server 500 or 600 through mesh network radio 370a to the addressed controller. However, other types of primary connections are possible. In the depicted embodiment, mesh network radio 120a has a mesh network link 910 to mesh network radio 370a. Furthermore, mesh network radio 220a is able to relay data via mesh network radio 120a to mesh network radio 370a, and vice versa.

Base station 300 also comprises a UHF broadcast radio 380a for one-way communication to controllers 100 and 200. UHF broadcast radio 380a is connected via UHF 1-way links 930 and 940 to controllers 100 and 200, respectively. According to an embodiment, UHF broadcast radio 380a is utilized only for backup connections. Thus, server 500 or 600 may cause base station 300 to relay data through UHF broadcast radio 380a instead of mesh network radio 370a whenever server 500 or 600 enters into fail-over mode for a controller.

According to an embodiment, base station 300 may comprise additional radios for connecting to server 500 or 600, each of which may be utilized by controllers 100 or 200 by proxy as yet another backup communication mechanism for establishing a backup connection.

Base station 300 is further attached to a number of sensors, including temperature sensor 301, wind sensor 302, rain sensor 303, solar sensor 304, and soil sensor 305. Base station 300 may communicated data from these sensors to server 500 or 600, as well as to controllers 100 and 200, using whatever communication mechanism possible.

2.10. Multiple Irrigation Servers and Synchronization

According to the embodiment depicted in FIG. 1, irrigation system 50 features two servers for redundancy should one of the servers fail. However, other embodiments of irrigation system 50 may feature just one server, or more than two servers. Each server 500 and 600 may include a mechanism for determining a primary server, such as a simple configuration setting or a more complex resolution protocol. The same irrigation server software should be running on both servers, generally having the same capabilities as described above.

According to an embodiment, inbound data from controllers should be relayed to all active servers. To avoid duplication of data transferred over expensive connections to servers 500 or 600 (such as cellular links), inbound data may be sent as email messages via a bank of SMTP servers, using a scheme of addressing messages to system emails on both servers. This way, the forking of the data into two for both servers 500 and 600 is accomplished in the Internet cloud, rather than at base station 300. However, other techniques for avoiding duplication of data may also be possible, including, for example, multicast data.

According to an embodiment, to ensure that servers remain synchronized even if a path to a server (or the server itself) should fail, synchronization mechanism 590—e.g. database synchronization software—may be utilized to move all data inserted on one server to the other server if not already there.

According to an embodiment, outbound data directed toward controllers 100 and 200, such as valve activation commands and updated delegated programs, are sent only by the primary (master) server in normal mode. The primary server simultaneously sends regular telegrams to the secondary server confirming that it is currently fulfilling its duties as primary server, causing the secondary server to stay inactive. However, if the primary server fails to send such telegrams or otherwise becomes isolated from the network, the telegrams will not reach the secondary server, and the secondary server will start behaving as the primary server. This alone may not cause gateways and controllers to accept inbound commands from the secondary server, since in fact the primary server may still be visible to them (even if not to the secondary server). However the gateways may also utilize a ping mechanism to periodically check that the primary server is reachable. If not, the gateways will begin accepting data from secondary server as if the secondary server were the primary server (and ignore any data from the now former primary server). Should the former primary server return online, it will become a secondary server.

The ping mechanism used by gateways to the current primary server may also used to synchronize time with that server, ensuring that the entire system 50 operates on the same clock. Ping responses from server may in fact contain the commands and/or delegated programs, since outbound mechanisms such as SMTP may not allow for direct replies to a ping. Other inbound payload mechanisms such as text messaging to the gateway may also or instead be used to duplicate ping responses.

2.11. Miscellaneous

According to an embodiment, controllers 100 and 200 may work in a more autonomous mode wherein the controller follows a delegated program even while still connected to server 500 or 600, but still listens for commands and newly updated programs from, as well as provides status updates to, server 500 or 600.

According to an embodiment, controllers 100 and 200 may, in some cases, preemptively trigger entry into fail-over mode for power conservation purposes. For example, in a low battery situation, controller 100 may still have a primary connection to server 500. However, controller 100 may predict that there is a risk of insufficient power to sustain the primary connection in the near future (e.g. because of overcast weather). Controller 100 may, in that case, deliberately switch off its communication mechanisms for a certain period of time, and then periodically "wake up" those communication mechanisms to check for updated programs. Controller 100 may continue to behave in this manner until its solar cells have recharged its battery to a certain level. In other embodiments, server 500 may observe or predict a potential power shortage and command controller 100 to enter into a similar power-saving mode for a certain period of time.

According to an embodiment, server 500 or 600 may use a backup connection to transfer any data—not just updated programs. Such data may include, for example, commands and forecast data. Servers 500 and 600 may also receive any type of data from controllers over two-way backup connections, including sensor data, program receipt confirmations, command execution feedback, and status updates.

According to an embodiment, each device in system 50 may advertise its communication mechanisms and/or active connections to each other device to facilitate the use of communication mechanisms at other devices as potential backup communication mechanisms.

According to an embodiment, controllers 100 and 200 may utilize backup communication mechanisms to send failure alerts (such as text messages or voicemails) to users. For this task, controllers 100 and 200 may utilize the same communication mechanisms as used for the server connections. Or, controllers 100 and 200 may utilize yet another backup communication mechanism for sending alerts.

According to an embodiment, controllers 100 and 200 send additional data to server 500 or 600 indicating any actions taken by controllers 100 and 200, both in normal mode and in fail-over mode. This data may be pooled while in fail-over mode and then sent to server 500 or 600 when the primary connection is re-established.

According to an embodiment of the invention, the acts of "establishing a connection," "establishing a communication link," "connecting," and like are considered to have occurred between two devices whenever any type of communication is successfully received by one of the two devices from the other of the two devices. Such communication may be one-way (e.g. a satellite broadcasts) or two-way (e.g. in the case of Internet communications). Any quantity of data received, no matter how small or large, is considered to constitute a "communication" for the purposes of establishing a connection, as long as the data is meaningful (e.g. data that has not been corrupted, and the meaning of which can be understood by the receiver at least in light of other communications received by the receiver). After establishment of a connection, the connection is said to be maintained as long as there is no failure in the connection. The terms "failure of a connection," "inability to establish a connection," and like refer to unsuccessful attempts by one device to receive communications from another, for example, listening for a broadcast from or directly pinging a server, and/or the observation of events or conditions by said device that guarantee that any such attempts will be unsuccessful. An established connection of one device to another is further said to have failed if the device cannot successfully communicate with the other device without the device itself taking some express action that causes communication to take place via a different type of communication mechanism than had been previously utilized for the established connection, no matter where in the communication path the different type of communication mechanism is situated.

According to an embodiment of the invention, a base station 300 may transparently provide controllers 100 and 200 with a proxy backup connection to a server 500 or 600 in response to the base station 300 detecting a failure in its own primary connection to server 500 or 600. Such a proxy backup connection allows the base station 300 to relay data received from server 500 or 600 via a less desirable or efficient communication mechanism at the base station 300 to controllers 100 and 200 via their primary communication mechanisms, in such a manner that controllers 100 and 200 are not required to take any special actions to maintain a connection to server 500 or 600.

3.0. Functional Review

Figure 6:
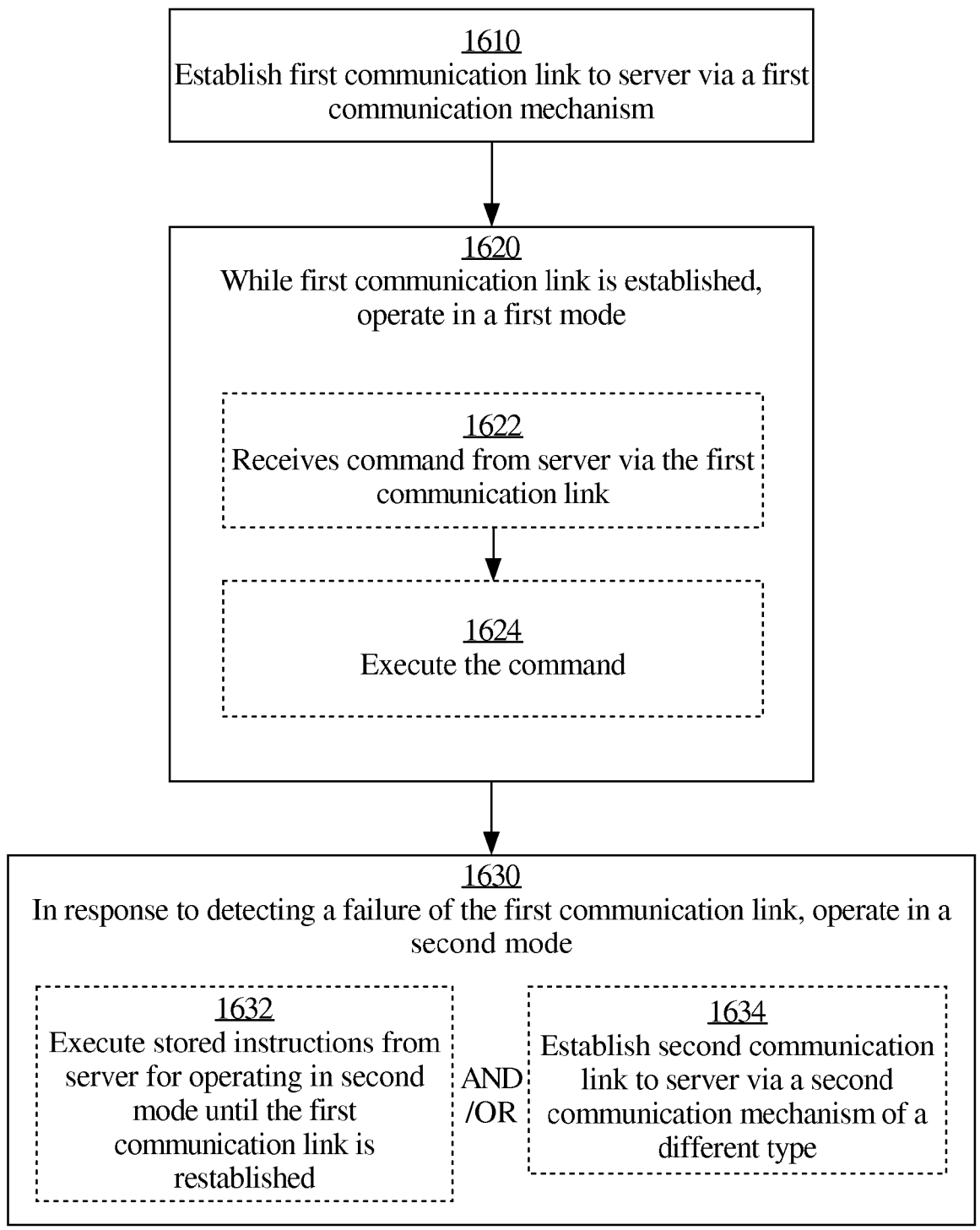
FIG. 6 is a flow diagram that illustrates a method for fault-tolerance in a system, according to an embodiment of the invention.

FIG. 6 is a flow diagram 1600 that illustrates a method for fault-tolerance in a system, according to an embodiment of the invention. At step 1610, a controller establishes a first communication link to one or more servers via a first communication mechanism. At step 1620, while the first communication link is established, the controller operates in a first mode. The controller operates in the first mode by performing at least steps 1622-1624. At step 1622, the controller receives a first command from one of said one or more servers via the first communication link. At step 1624, in response to receiving the first command, the controller executes the first command.

At step 1630, in response to detecting a failure of the first communication link, the controller transitions to and operates in a second mode. The controller operates in the second mode by performing at least one of steps 1632-1634. At step 1632, the controller executes one or more stored sets of instructions for operating in the second mode until the controller re-establishes the first communication link. The one or more stored sets of instructions have been received from at least one of said one or more servers. At step 1634, the controller establishes a second communication link to the one or more servers via a second communication mechanism, wherein the second communication mechanism is of a different type than the first communication mechanism.

Figure 7:
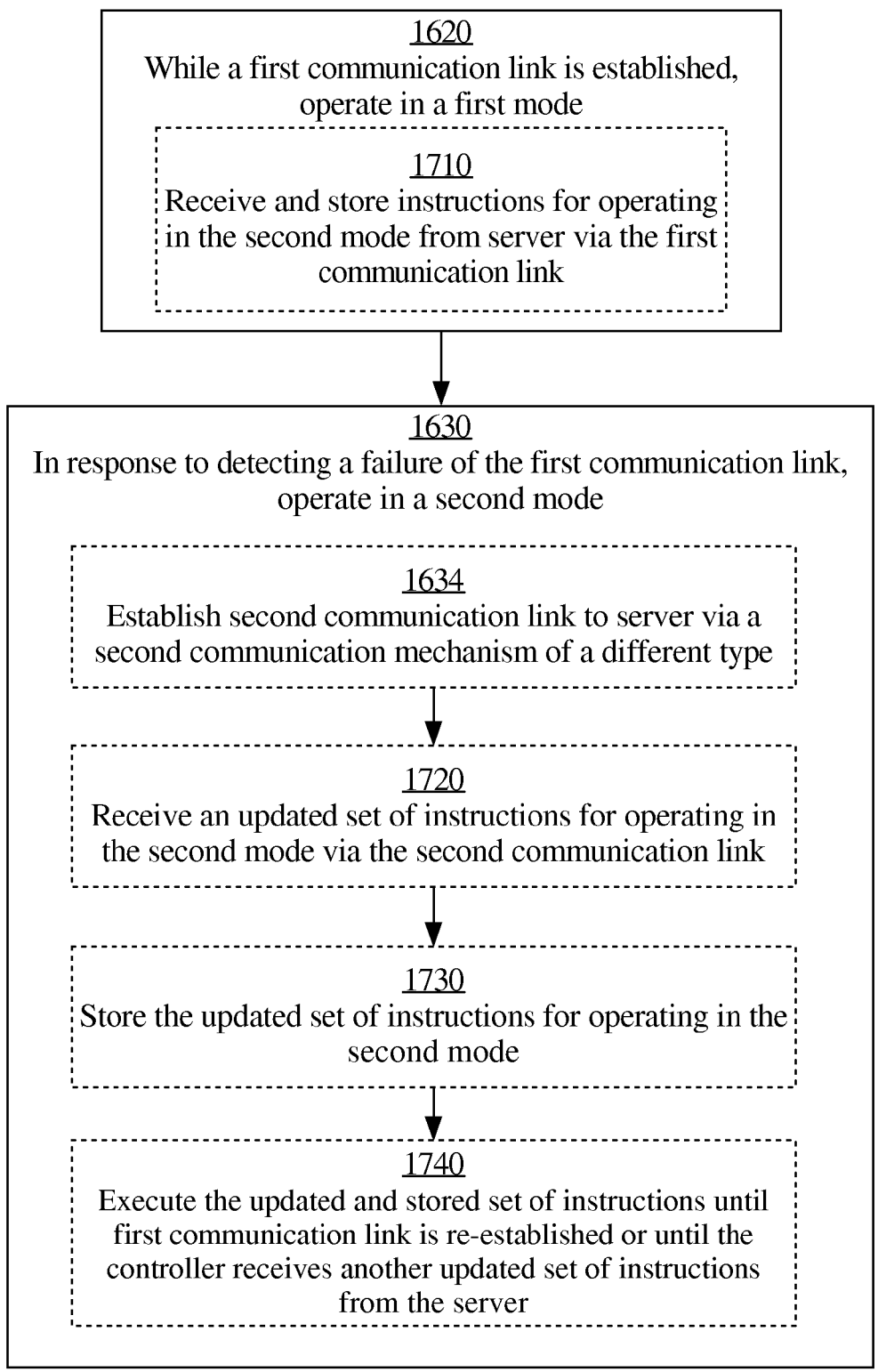
FIG. 7 is a flow diagram that illustrates a method for receiving updated failover programs while in a failover mode, according to an embodiment of the invention.

FIG. 7 is a flow diagram 1700 for receiving updated failover programs while in a failover mode, according to an embodiment of the invention. At step 1710, while operating in a first mode per step 1620 of flow diagram 1600, the controller receives and stores at least one of said one or more stored sets of instructions for operating in the second mode from the one or more servers via the first communication link. The remaining steps of flow diagram 1700 occur while a second communication link has been established in a second mode upon a connection failure via, e.g., step 1634 from flow diagram 1600. At step 1720, while in the second mode, the controller receives an updated set of instructions for operating in the second mode from one of the one or more servers via the second communication link. At step 1730, the controller stores the updated set of instructions. At step 1740, the controller executes the updated and stored set of instructions until the controller re-establishes the first communication link or until the controller receives yet another updated set of instructions from the server.

Figure 8:
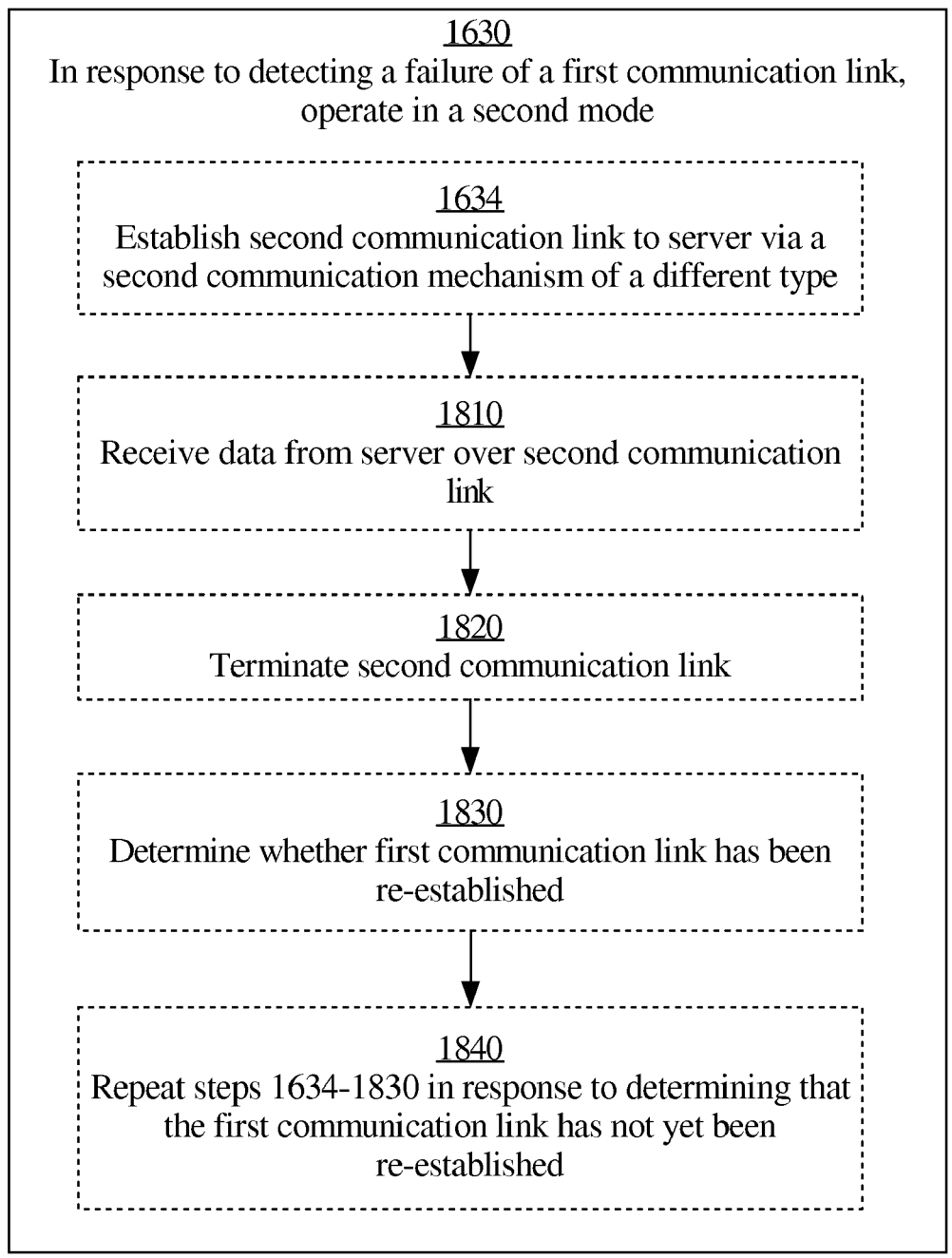
FIG. 8 is a flow diagram that illustrates a method for operating in a fail-over mode, according to an embodiment of the invention.

FIG. 8 is a flow diagram 1800 for operating in a fail-over mode, according to an embodiment of the invention. The steps of flow diagram 1800 may be performed, for instance, in response to entering the second mode per step 1630 of flow diagram 1600. At step 1634, the controller establishes said second communication link. At step 1810, the controller receives data from one of the one or more servers over said second communication link. At step 1820, the controller terminates said second communication link. At step 1830, the controller determines whether the first communication link has been re-established. At step 1840, the controller repeats steps 1634-1830 in response to determining that the first communication link has not yet been re-established.

4.0. Structural Review

Figure 9:
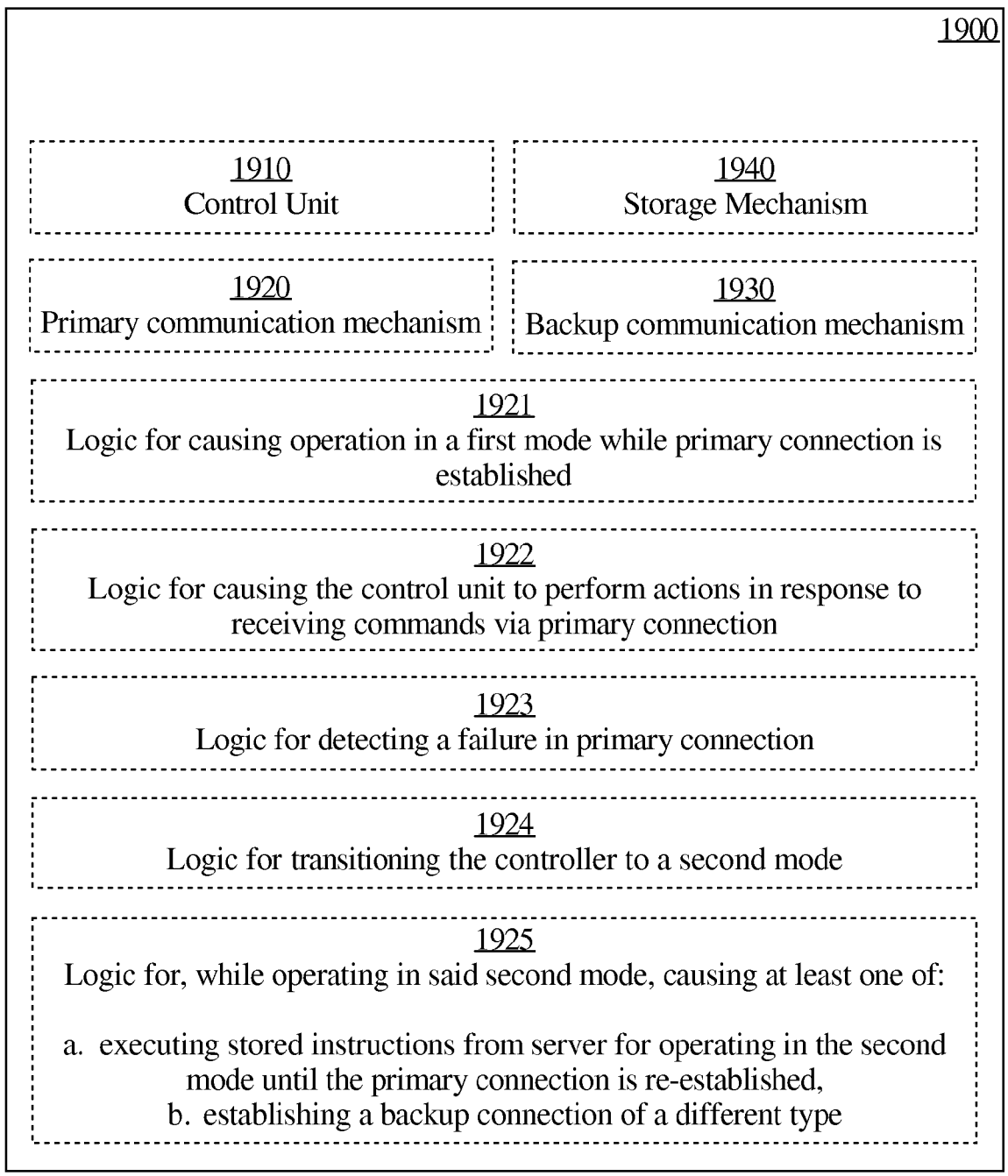
FIG. 9 is a block diagram of a device for use in a fault-tolerant system, according to an embodiment of the invention.

FIG. 9 is a block diagram of a device 1900 for use in a fault-tolerant system, according to an embodiment of the invention. Device 1900 is merely an example device for implementing the techniques described herein. Other devices with fewer or more components and other configurations are possible.

Device 1900 comprises each of:
- a control unit 1910 for performing actions;
- a primary communication mechanism 1920 for establishing a primary connection to one or more servers and for receiving data via said primary connection, said data including commands;
- logic 1921, operatively coupled to said primary communication mechanism, for causing said controller to operate in a first mode while said primary connection is established;
- logic 1922, operatively coupled to said primary communication mechanism, for, while operating in the first mode, causing the control unit to perform actions in response to receiving said commands via said primary connection;

logic 1923, operatively coupled to said primary communication mechanism, for detecting a failure in said primary connection;

logic 1924, operatively coupled to said primary communication mechanism, for transitioning the controller to a second mode;

logic 1925, operatively coupled to said primary communication mechanism, for, while operating in said second mode, causing the controller to perform at least one of the steps of:
  a. executing one or more stored sets of instructions for operating in the second mode until the controller re-establishes the primary connection, wherein the one or more stored sets of instructions have been received from at least one of said one or more servers; or
  b. establishing a backup connection to the one or more servers via a backup communication mechanism, wherein the backup communication mechanism is of a different type than the primary communication mechanism.

said backup communication mechanism 1930; and a storage mechanism 1940 for storing said one or more stored sets of instructions.

5.0. Implementation Mechanism-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
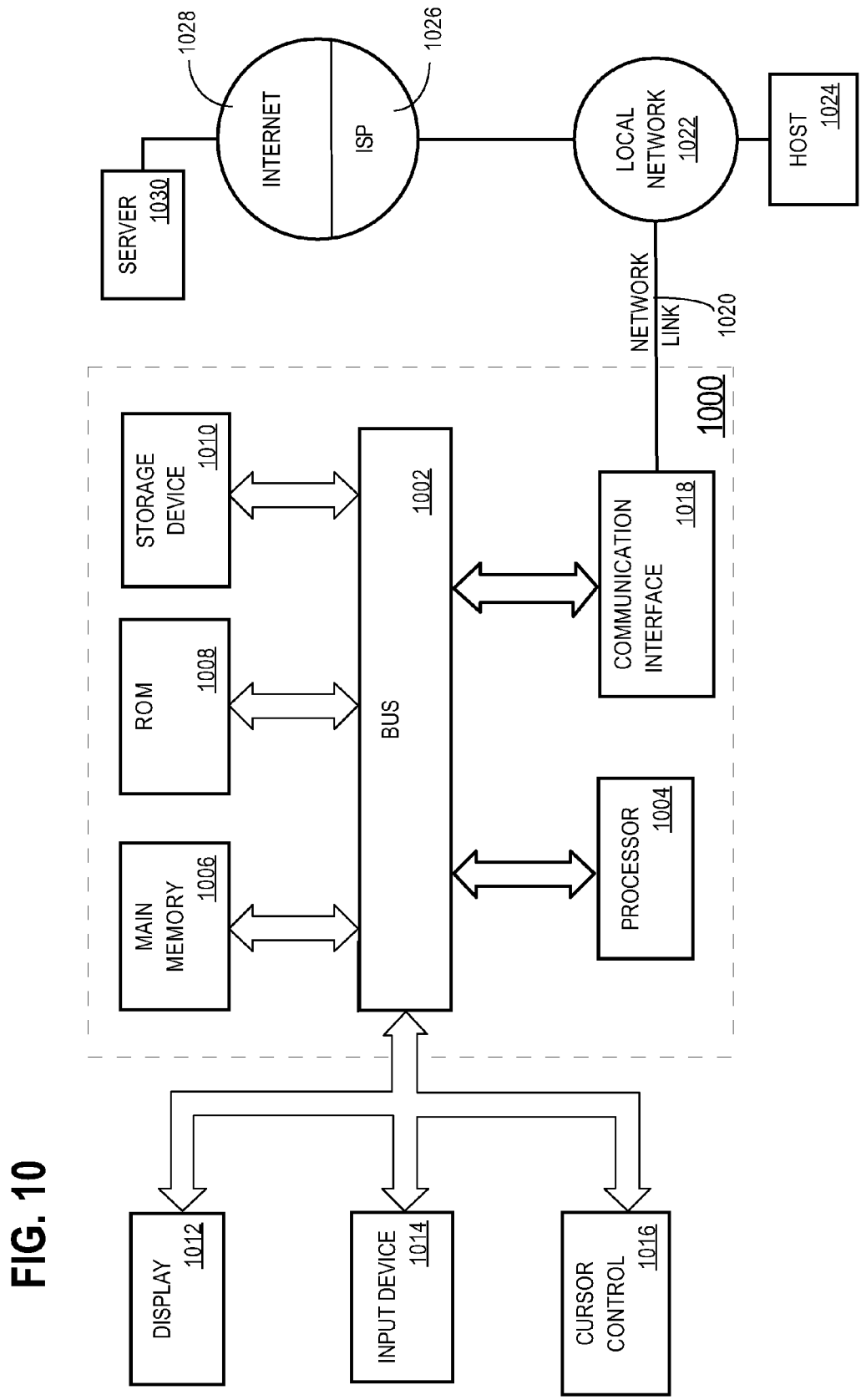
FIG. 10 is block diagram of a computer system upon which embodiments of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for remote management of an irrigation controller, the method comprising the steps of:
    the irrigation controller establishing a first communication link to one or more servers via a first communication mechanism;
    while the first communication link is established, the irrigation controller operating in a first mode and receiving, from the one or more servers, updates to a delegated program for operating the irrigation controller while in a second mode;
    wherein the delegated program comprises a set of condition-based instructions that is updated by the one or more servers based at least in part upon environmental data available to the one or more servers;
    while the irrigation controller operates in the first mode, performing the steps of:
        the irrigation controller receiving a first command from one of said one or more servers via the first communication link;
        in response to receiving the first command, the irrigation controller executing the first command;
    in response to detecting a failure of the first communication link, the irrigation controller transitioning to the second mode;
    while the irrigation controller operates in the second mode, the irrigation controller executing the delegated program until the irrigation controller re-establishes the first communication link;
    wherein executing the delegated program while operating in the second mode causes:
        accessing sensor data that is available to the irrigation controller while in the second mode, but unavailable to the one or more servers, wherein the sensor data is more recent than the environmental data upon which the set of condition-based instructions in the delegated program was last updated prior to transitioning to the second mode;
        identifying actions to perform based upon applying the sensor data to the set of condition-based instructions in the delegated program, as last updated by the one or more servers prior to transitioning to the second mode;
        causing performance of the identified actions.

2. The method of claim 1, wherein:
    causing performance of the identified actions comprises performing one or more actions for controlling irrigation; and
    the condition-based instructions include one or more instructions for controlling irrigation.

3. The method of claim 1, wherein, while operating in said second mode, the irrigation controller establishes a second communication link, the method further comprising, while operating in said second mode:
    the irrigation controller receiving a new update to the delegated program from one of said one or more servers via the second communication link.

4. The method of claim 1, further comprising, during the failure, the irrigation controller performing the steps of:
    (1) establishing a second communication link;
    (2) receiving data from one of the one or more servers over said second communication link;
    (3) terminating said second communication link;
    (4) determining whether the first communication link has been re-established; and
    (5) repeating steps (1)-(4) in response to determining that the first communication link has not yet been re-established.

5. The method of claim 4, wherein the second communication link is less energy efficient or more costly to maintain than the first communication link.

6. The method of claim 1, wherein:
    the environmental data used to generate the condition-based instructions includes at least forecast data for an area in which the irrigation controller is deployed.

7. The method of claim 1, wherein the sensor data is collected from one or more sensors attached to said irrigation controller.

8. The method of claim 1, further comprising the irrigation controller causing said failure by turning off said first communication mechanism to conserve power.

9. A irrigation controller comprising:
a control unit for performing actions;
a primary communication mechanism for establishing a primary connection to one or more servers and for receiving data via said primary connection, said data including commands to execute in a first mode and updates to a delegated program for operating the irrigation controller while in a second mode;
wherein the delegated program comprises a set of condition-based instructions that is updated by the one or more servers based at least in part upon environmental data available to the one or more servers;
logic, operatively coupled to said primary communication mechanism, for causing said irrigation controller to operate in the first mode while said primary connection is established;
logic, operatively coupled to said primary communication mechanism, for, while operating in the first mode, causing the control unit to perform actions in response to receiving said commands via said primary connection;
logic, operatively coupled to said primary communication mechanism, for detecting a failure in said primary connection;
logic, operatively coupled to said primary communication mechanism, for transitioning the irrigation controller to the second mode upon detecting the failure;
logic, operatively coupled to said primary communication mechanism, for, while operating in said second mode, executing the delegated program until the irrigation controller re-establishes the primary connection;
wherein executing the delegated program while operating in the second mode causes:
accessing sensor data that is available to the irrigation controller while in the second mode, but unavailable to the one or more server, wherein the sensor data is more recent than the environmental data upon which the set of condition-based instructions in the delegated program was last updated prior to transitioning to the second mode;
identifying actions to perform based upon applying the sensor data to the set of condition-based instructions in the delegated program, as last updated by the one or more servers prior to transitioning to the second mode;
causing performance of the identified actions.

10. The irrigation controller of claim 9, wherein:
the identified actions are actions for controlling irrigation; and
the condition-based instructions include one or more instructions for controlling irrigation.

11. The irrigation controller of claim 9, further comprising:
a backup communication mechanism;
logic, operatively coupled to said backup communication mechanism, for receiving a new update to the delegated program via said backup connection while operating in said second mode.

12. The irrigation controller of claim 11, further comprising:
a backup communication mechanism for establishing a backup connection; and
logic, operatively coupled to said backup communication mechanism, for, while operating in said second mode, performing the steps of:
(1) establishing said backup connection;
(2) receiving data from one of the one or more servers over said backup connection;
(3) terminating said backup connection;
(4) determining whether the primary connection has been re-established; and
(5) repeating steps (1)-(4) in response to determining that the primary connection has not yet been re-established.

13. The irrigation controller of claim 12, wherein the backup connection is less energy efficient or more costly to maintain than the primary connection.

14. The irrigation controller of claim 12, wherein the primary communication mechanism is an interface for a wireless mesh network and the backup communication mechanism is one of an interface for a cellular network, satellite network, or wired telephone network.

15. The irrigation controller of claim 9, wherein the irrigation controller is coupled to a backup communication mechanism, the irrigation controller further comprising:
logic, operatively coupled to the primary communication mechanism, for determining a plurality of paths over at least two different types of networks for establishing connections to the one or more servers;
wherein the backup communication mechanism is a component of a device other than the irrigation controller;
wherein said device is connected to the irrigation controller via said primary communication mechanism; and
wherein the a backup connection is routed via the backup communication mechanism through a different type of network than the primary connection.

16. The irrigation controller of claim 9, further comprising:
a storage mechanism for storing the delegated program;
logic, operatively coupled to said primary communication mechanism, for identifying in the data received via the primary connection a first set of instructions for storage in said storage mechanism; and
logic, operatively coupled to said storage mechanism, for causing said first set of instructions to be stored in said storage mechanism as the delegated program in response to said identifying.

17. The irrigation controller of claim 9, wherein:
the environmental data used to generate the condition-based instructions includes at least forecast data for an area in which the irrigation controller is deployed.

18. The irrigation controller of claim 9, wherein the delegated program is compiled byte-code.

19. The irrigation controller of claim 9, further comprising:
a storage mechanism for storing said one or more stored sets of instructions;
a backup communication mechanism;
logic, operatively coupled to said backup communication mechanism, for, while operating in said second mode, identifying in data received via the backup communication mechanism a new update to the delegated program for storage in said storage mechanism;
logic, operatively coupled to said storage mechanism, for, while operating in said second mode, causing the new update to be stored in said storage mechanism in response to said identifying.

20. The irrigation controller of claim 9, further comprising:
one or more sensor mechanisms for collecting the sensor data.

21. The irrigation controller of claim 9, further comprising:
one or more sensor mechanisms for collecting sensor data;
logic, operatively coupled to said primary communication mechanism, for, while operating in the second mode, sending said sensor data via the primary communication mechanism or a backup communication mechanism to another irrigation controller or a gateway.

22. The irrigation controller of claim 9, further comprising at least one of:
- a signal generating mechanism for generating audible or visible alerts indicating said failure;
- logic for sending a command to another irrigation controller to generate an audible or visible alert indicating said failure.

23. The irrigation controller of claim 9, wherein the control unit controls an irrigation valve.

24. The irrigation controller of claim 9, further comprising:
- a battery for powering said irrigation controller;
- a power generating mechanism coupled to said battery for charging said battery;
- logic for, in response to determining that the charge level of the battery has dropped below a certain level, causing the first communication mechanism to turn off, thereby causing said failure, until the charge level of the battery has risen above another certain level.

25. The irrigation controller of claim 9, wherein the one or more servers comprise a master server and a backup server.

26. The method of claim 1, wherein accessing the sensor data comprises requesting via, a wireless mesh network, at least some of the sensor data from one or more nodes that also are not in contact with the one or more servers.

27. The irrigation controller of claim 9, further comprising logic for, while operating in the second mode, receiving at least some of the sensor data via the primary communication mechanism or a backup communication mechanism.

28. The method of claim 1, wherein the environmental data upon which the condition-based instructions are generated includes historical trend data.

29. The irrigation controller of claim 9, wherein the environmental data upon which the condition-based instructions are generated includes historical trend data.

30. The method of claim 1, further comprising:
- the one or more servers periodically: accessing updated forecast data for an area in which the irrigation controller is located, generating the updates to the delegated programs based on at least the updated forecast data and historical trends for the area, and sending the updates to the irrigation controller.

* * * * *